United States Patent
Deighton (10) Patent No.: US 8,950,793 B2
(45) Date of Patent: Feb. 10, 2015

(54) SEMI TRAILOR UNDERRUN PROTECTION

(71) Applicant: Sapa Extrusions, Inc., Rosemont, IL (US)

(72) Inventor: Malcolm Deighton, Portland, OR (US)

(73) Assignee: Sapa Extrusions Inc., Rosemont, IL (US)

( * ) Notice: Subject to any disclaimer, the term of this patent is extended or adjusted under 35 U.S.C. 154(b) by 0 days.

(21) Appl. No.: 13/849,957

(22) Filed: Mar. 25, 2013

(65) Prior Publication Data

US 2013/0249223 A1 Sep. 26, 2013

Related U.S. Application Data

(60) Provisional application No. 61/614,902, filed on Mar. 23, 2012.

(51) Int. Cl.
*B60R 19/56* (2006.01)

(52) U.S. Cl.
CPC ........................... *B60R 19/56* (2013.01)
USPC ................ 293/102; 293/132; 293/133

(58) Field of Classification Search
CPC .................. B60R 19/56; B60R 19/565
USPC ............. 293/132, 133, 154, 155, 102, 103
See application file for complete search history.

(56) References Cited

U.S. PATENT DOCUMENTS

| 1,729,274 | A | * | 9/1929 | Millar | 362/505 |
|---|---|---|---|---|---|
| 3,664,701 | A | | 5/1972 | Kondur | |
| 4,154,504 | A | * | 5/1979 | Mohs | 359/514 |
| 4,359,239 | A | * | 11/1982 | Eggert, Jr. | 293/132 |
| 4,947,293 | A | * | 8/1990 | Johnson et al. | 362/485 |
| 6,089,629 | A | * | 7/2000 | Hope et al. | 293/132 |
| 6,116,667 | A | * | 9/2000 | Torcomian | 293/132 |
| 6,176,530 | B1 | * | 1/2001 | Gollungberg | 293/133 |
| 6,183,025 | B1 | * | 2/2001 | Hope et al. | 293/131 |
| 6,334,638 | B1 | * | 1/2002 | Yamamuro et al. | 293/133 |

(Continued)

FOREIGN PATENT DOCUMENTS

| DE | 202007002310 U1 | 4/2007 |
|---|---|---|
| DE | 202007012568 U1 | 11/2007 |

(Continued)

OTHER PUBLICATIONS

International Searching Authority, "International Search Report and Written Opinion of the International Searching Authority," issued in connection with application No. PCT/US2013/033557, mailed on Jun. 13, 2013, 7 pages.

(Continued)

*Primary Examiner* — Gregory Blankenship
(74) *Attorney, Agent, or Firm* — Loeb & Loeb LLP (57) ABSTRACT

The device may have a plurality of upright supports where the supports may include a mounting plate with mounting openings, a plurality of vertical members that may be in non-welded communication with the extruded back mounting plate and a plurality of horizontal members where the vertical members provide strength and support to the supports. The horizontal under-run prevention beam may include mounting openings that correspond to the horizontal beam mounting openings and a removable reflective strip that correspond to reflective strip openings in the beam. The vertical and horizontal members may be stacked extruded rectangles of the desired widths and lengths.

15 Claims, 10 Drawing Sheets

(56) References Cited

U.S. PATENT DOCUMENTS

| | | | |
|---|---|---|---|
| 6,435,697 B1 * | 8/2002 | Simmons et al. | 362/219 |
| 6,461,028 B1 * | 10/2002 | Huang | 362/505 |
| 6,652,010 B1 * | 11/2003 | Huddle et al. | 293/102 |
| 6,733,161 B2 * | 5/2004 | Tufte | 362/505 |
| 6,764,116 B2 * | 7/2004 | Ledford et al. | 293/102 |
| 6,932,397 B2 * | 8/2005 | Svendsen et al. | 293/117 |
| 6,962,378 B2 * | 11/2005 | Ledford et al. | 293/102 |
| 7,025,481 B2 * | 4/2006 | Moll | 362/487 |
| 7,237,932 B2 * | 7/2007 | Ter-Hovhannissian | 362/485 |
| 7,950,705 B2 * | 5/2011 | Saitou | 293/102 |
| 2004/0217604 A1 * | 11/2004 | Ledford et al. | 293/102 |
| 2008/0055725 A1 * | 3/2008 | Dornbos | 359/548 |
| 2008/0073941 A1 | 3/2008 | Wylezinski | |
| 2009/0001768 A1 | 1/2009 | Saitou | |
| 2010/0176608 A1 * | 7/2010 | Schelberg et al. | 293/117 |
| 2010/0202150 A1 * | 8/2010 | Adams | 362/485 |
| 2011/0080011 A1 * | 4/2011 | McKee et al. | 293/117 |
| 2013/0127187 A1 * | 5/2013 | Hirose | 293/102 |
| 2013/0249223 A1 * | 9/2013 | Deighton | 293/103 |

FOREIGN PATENT DOCUMENTS

| | | | | |
|---|---|---|---|---|
| DE | 102008039513 A1 | | 2/2010 | |
| DE | 102009036652 A1 | | 4/2010 | |
| JP | 2008021417 A | | 1/2008 | |
| JP | 2008-62761 | * | 3/2008 | B60R 19/56 |
| JP | 2008-62838 | * | 3/2008 | B60R 19/56 |
| JP | 2010006278 A | | 1/2010 | |
| WO | 2009041866 A1 | | 4/2009 | |

OTHER PUBLICATIONS

International Bureau, "International Preliminary Report on Patentability," issued in connection with application No. PCT/US2013/033557, mailed on Sep. 23, 2014, 5 pages.

\* cited by examiner

SEMI TRAILOR UNDERRUN PROTECTION

The purpose of the under-run apparatus is to ensure that a vehicle such as a car that hits that back of a trailor/er does not drive under the trailor but is stopped by the under-run device before the vehicle travels under the trailor. Trailor under-run devices are mandated by governments to protect drivers and the under-run device must meet governmental standards.

There are significant disadvantages to current under-run devices. Current under-run and rear bumpers on trailors are one piece welded designs that labor intensive to create, install and maintain. They are heavy which requires a significant amount of fuel to haul. The bumpers also require coatings to protect against corrosion. Applying the coatings is an expensive process that is often done off site, requiring hauling the bumpers from the point of manufacture to another location where the coating is applied. As the devices are often welded together, if an under-run device is damaged, the entire under-run device must be replaced which is time consuming and expensive.

SUMMARY

An under-run protection device for a tractor trailer is disclosed. The device may have a plurality of upright supports where the supports may include a mounting plate with mounting openings, a plurality of vertical members that may be in non-welded communication with the extruded back mounting plate and a plurality of horizontal members where the vertical members provide strength and support to the supports. The supports also may have a plurality of horizontal members that may be in non-welded communication with the vertical members and the hack mounting plate. At least one of the horizontal members may include horizontal truck mounting openings and at least one of the horizontal members may include horizontal beam mounting openings. The horizontal under-run prevention beam may include mounting openings that correspond to the horizontal beam mounting openings and a removable reflective strip that correspond to reflective strip openings in the beam. The vertical and horizontal members may be stacked extruded rectangles of the desired widths and lengths.

Advantageously, some or almost all of the parts of the device may be made from extruded aluminum. The device will be strong, light weight, corrosion resistant and easy to install. In addition, the design allows easy replacement of parts of the device as easily releasable connections are used in the place of welds.

DESCRIPTION

Figure 1:
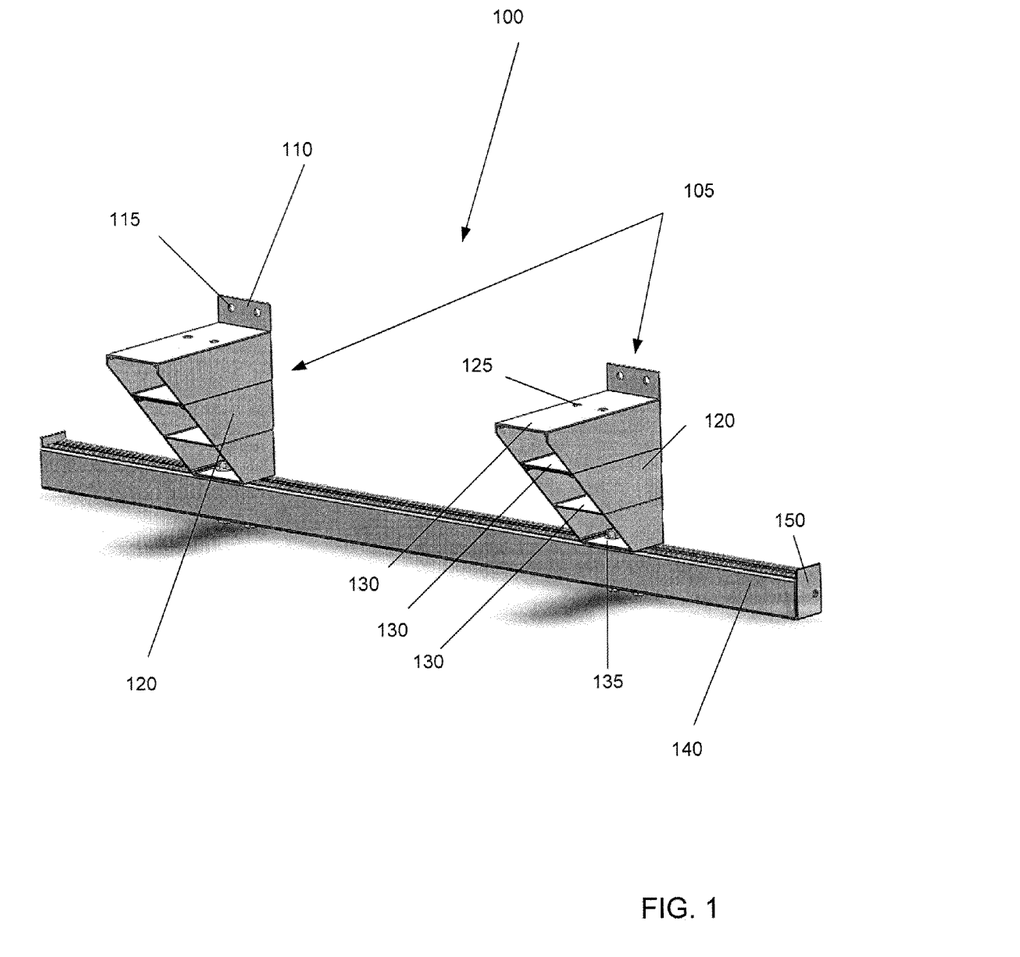
FIG. 1 is an illustration of semi-trailor under-run apparatus with two supports.
Figure 2:
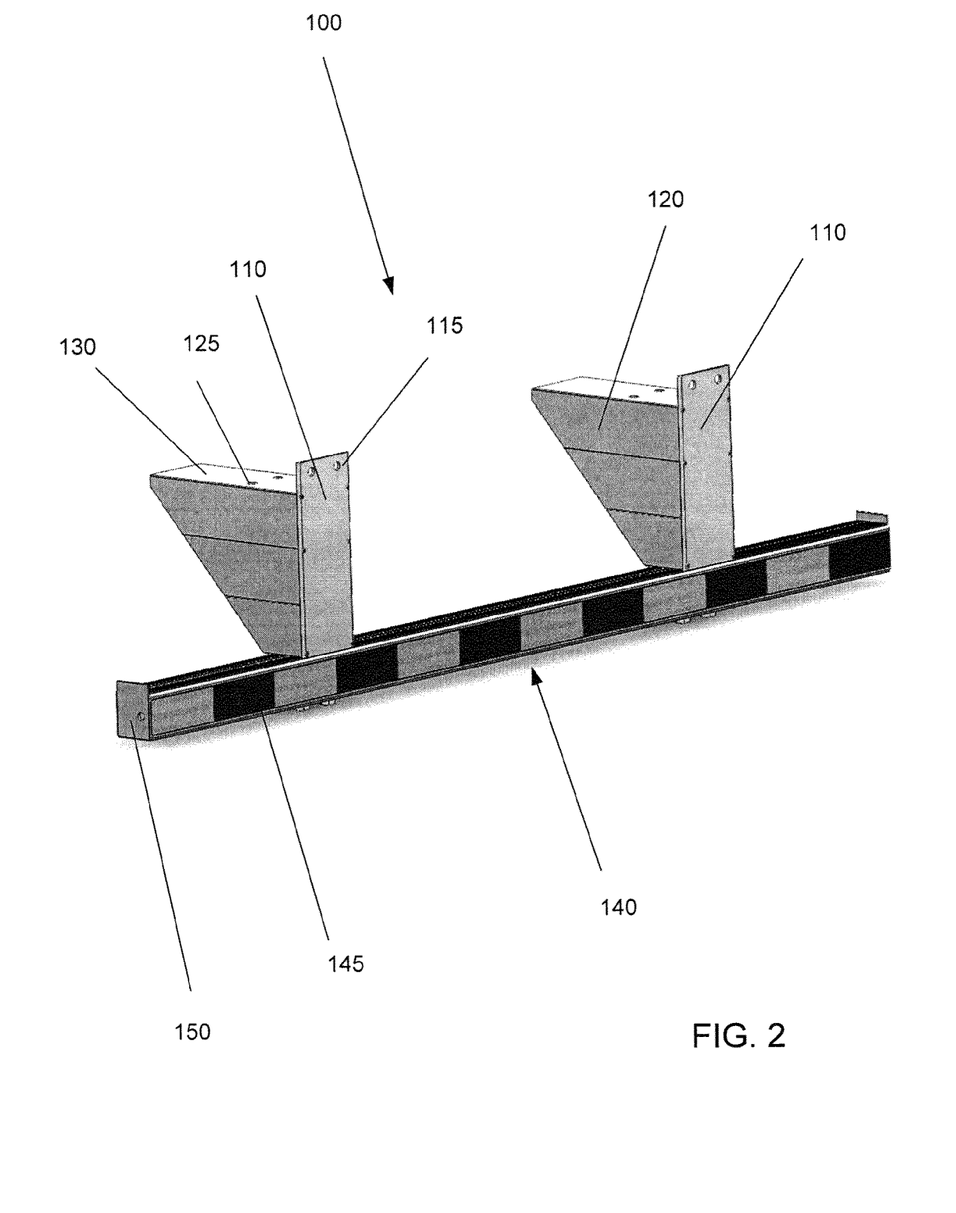
FIG. 2 is an illustration of semi-trailor under-run apparatus with two supports.

FIGS. 1 and 2 illustrate a semi-trailor under-run apparatus. The purpose of the under-run apparatus is to ensure that a vehicle such as a car that hits that back of a tractor trailor does not drive under the trailor but is stopped by the under-run device before the vehicle travels under the trailor. Trailor under-run devices are mandated by governments to protect drivers and the under-run device must meet governmental standards.

There are significant disadvantages to current under-run devices. Current under-run and rear bumpers on traitors are one piece welded designs that are labor intensive to create. They are heavy which requires a significant amount of fuel to haul. The bumpers also require coatings to protect against corrosion. Applying the coatings is an expensive process that is often accomplished off site, requiring hauling the bumpers from the point of manufacture to another location where the coating is applied. As the devices are often welded together, if an under-run device is damaged, the entire under-run device must be replaced which is time consuming and expensive.

The present device addresses many of the shortcomings of current devices. The present device 100 may be made from a variety of materials including a variety of combination of materials. In one embodiment, the device 100 may be made from extruded aluminum, such as 6061 T6 aluminum, which is light weight, strong, and corrosion resistant but parts of the device 100 may be of different materials. Further, the design allows for the device to be created without using welding which allows parts to be easily replaced without using welding. Parts of the device may be welded together in some cases but in most embodiments, the parts of the device 100 will be held together without welds in a manner that is easily replaceable and releasable. Further, the design is flexible and may be installed on a variety of trailors. These and other advantages will become apparent from reviewing the specification, the drawings and the claims of this application.

The under-run protection device for a tractor trailor 100 may have one or more upright supports 105 that attach to a tractor traitor (not shown) and to a horizontal protection beam 140. The supports 105 may have a mounting plate 110 that may be an appropriately sized aluminum extruded piece. Of course, the mounting plate 110 may be made of other appropriate materials that provide the desired strength, durability and corrosion resistance.

Figure 3:
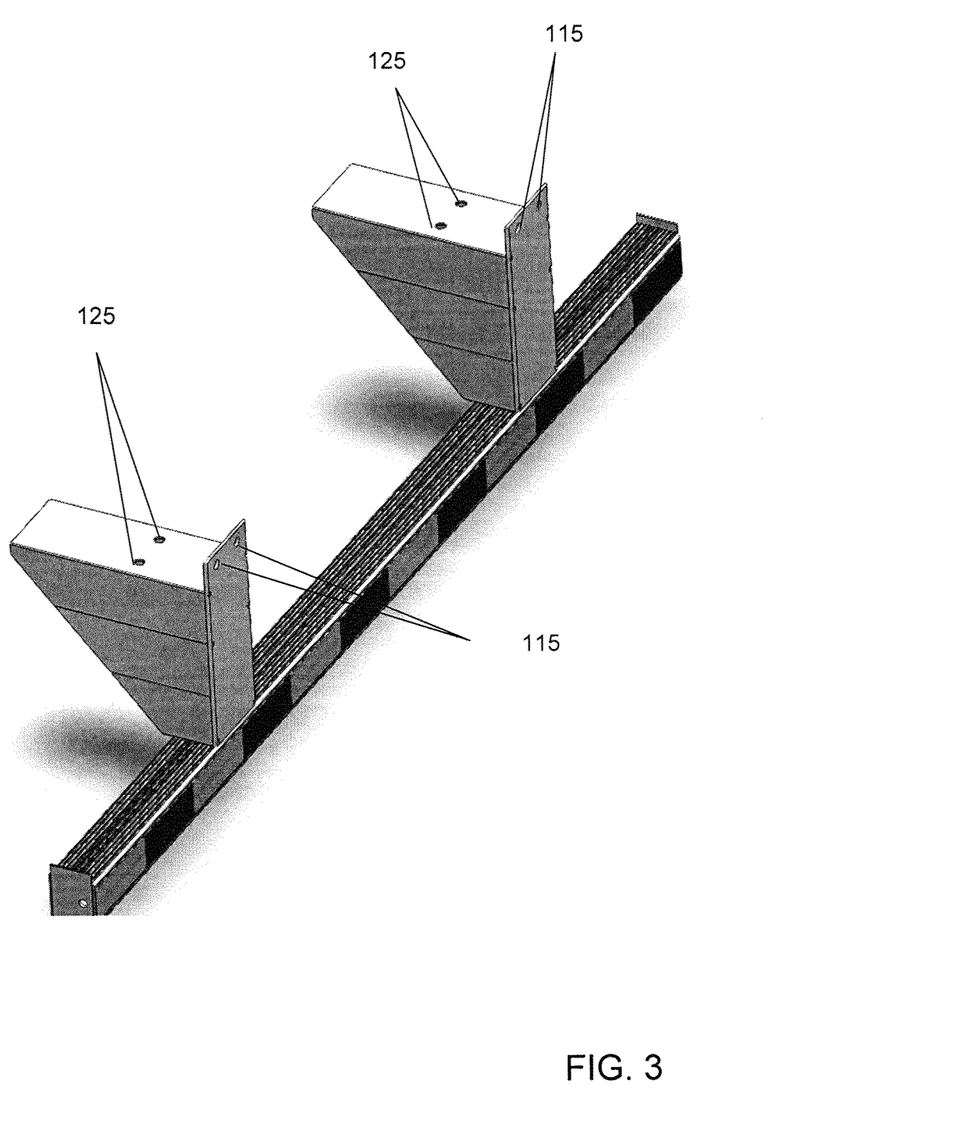
FIG. 3 is an illustration of semi-trailor under-run apparatus with two supports highlighting the mounting openings on the apparatus.

The mounting plate 110 may have vertical truck mounting openings 115 or holes. The openings 115 may match openings on the trailor (not shown) and the openings 115 may allow bolts or other removable but sturdy connecting devices to be used to attach the support 105 to the trailor into appropriate receivers on the trailor. In some embodiments, the mounting plate may also have openings (not shown) to attach the mounting plate 110 to the protection beam 140. If the device fitted to a new trailor design, for example, new openings may be made with an appropriate device such as a drill or punch.

The length and size of the mounting plate 110 may depend on the desired height of the protection beam 140, the width of the supports 105, etc. The thickness of the mounting plate 110 may be such that it has the strength to support the weight of the supports 105 and the protection beam 140 and withstand the pounding from being attached to a tractor trailor.

Figure 5:
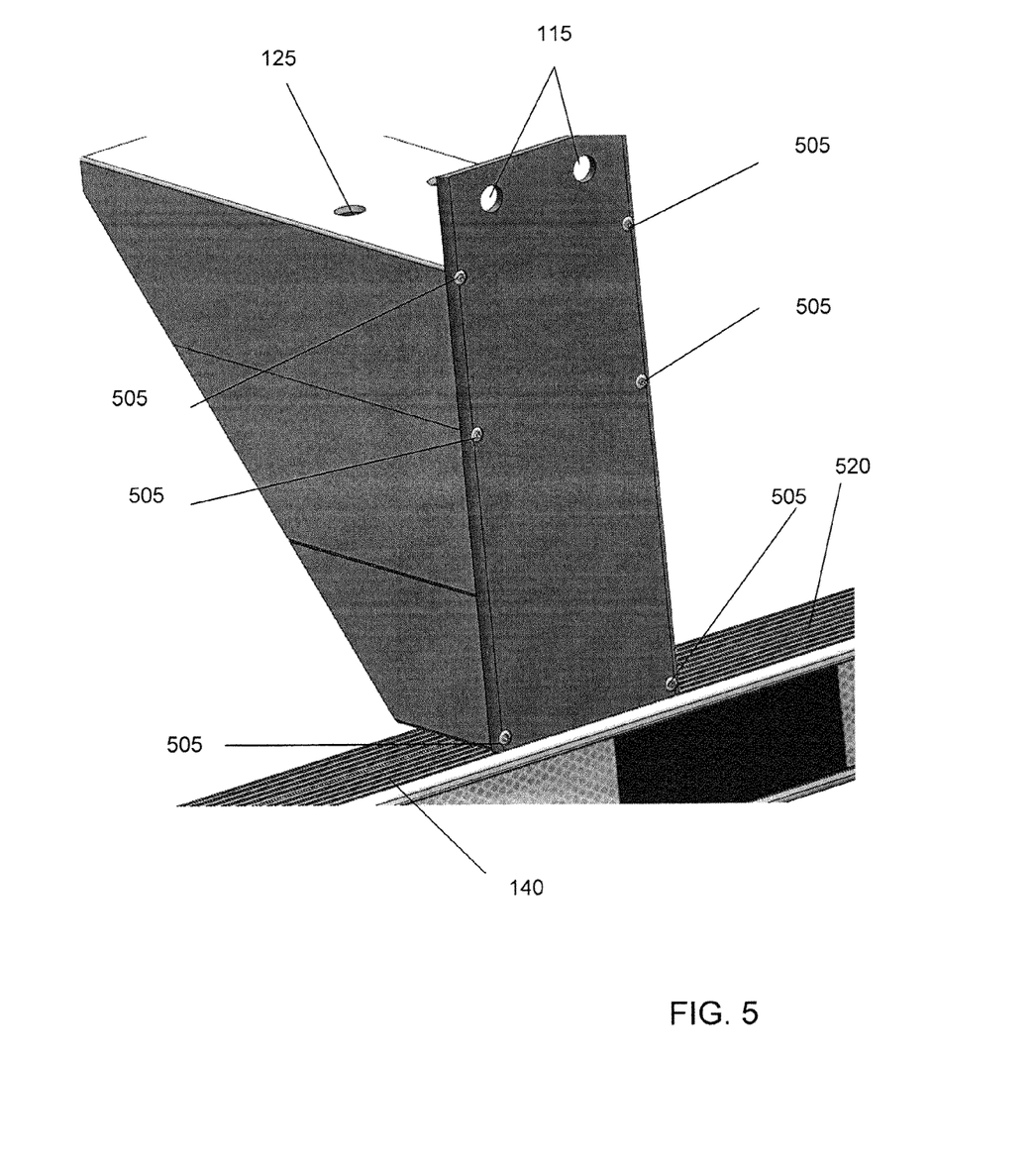
FIG. 5 is an illustration of the mounting plate removable attachment.

As best illustrated in FIG. 5, the mounting plate 110 may be attached to the support 105 in an easily detachable, easily replaceable, non-welded manner. In one embodiment, the mounting plate 110 is attached to the vertical members 120 using screws or bolts and nuts. The screws may fit into a receiver such as a threaded opening on the support 105, the vertical members 120 or the horizontal members 130. In another embodiment, a snap fit may be used. Of course, other manners of attaching the mounting plate 110 to the vertical members 120 (or horizontal members 130) may be possible and is contemplated.

The supports 105 also may have one or more vertical members 120 to assist in connecting the trailor to the protection beam 140 and having the protection beam 140 supported at the desired height. The vertical members 120 may be adapted to be in non-welded communication with the mounting plate 110 and the plurality of horizontal members 130. As may be seen from the illustration, the length of the vertical members 120 may relate to the desired height of the protection beam 140. The vertical members 120 may add strength to the support 105 and assist in supporting the protection beam 140 from the trailor.

The supports 105 may also have at least one horizontal member 130. The horizontal support member 130 may be in non-welded communication with the vertical support members 120 and possibly the mounting plate 110. In one embodiment, a first horizontal member 130 may have horizontal truck mounting openings 125 which may be holes through which a screw or bolt is inserted to connect the horizontal member 130 to the trailor. The horizontal truck mounting openings 125 may have a varied location depending on the trailor.

A second horizontal member 130 may have protection beam mounting openings 135 which may be used to attach the protection beam 140 to the horizontal member 130. The beam 140 may be mounted used bolts, screws, rivets, snap fits or any other non-welded connection that may be disengaged with minimal effort when desired but sufficient strength to support the protection beam 140 and withstand a collision. In some embodiments, the mounting plate 110 may have mounting openings for the protection beam 140 and in yet other embodiments, the vertical members 120 may have the beam mounting openings. As may be understood, there are a variety of ways to connect the protection beam 140 to the trailor using the upright supports 105.

Figure 4:
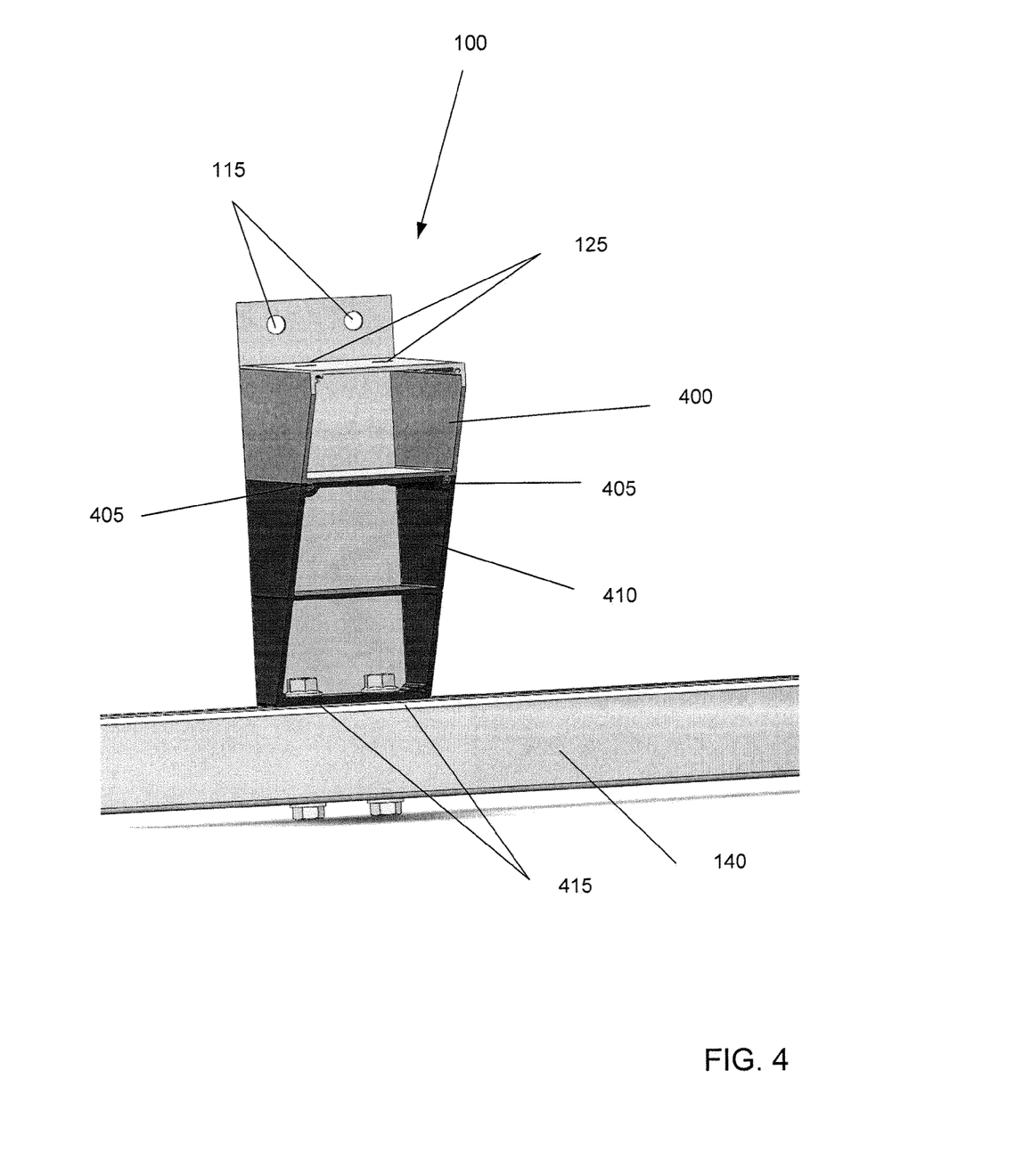
FIG. 4 is an illustration of a support that is made of two extruded tubes.

In one embodiment as illustrate in FIG. 4, the upright supports 105 are made up of a plurality of rectangular extruded tubes which are connected to form the vertical members 120 and the horizontal members 130 with the mounting plate 110 being attached in a removable manner. In one embodiment, there may be two extrusions with a first extrusion 400 being proximate to the trailor and the second extrusion 410 being proximate to the protection beam 140. The two extrusions may be connected by a connection device 405 in an easily releasable, non-welded manner, such as a sleeve and a protuberance that tightly fits or interlocks into the sleeve. In other embodiments, the first extrusion 400 and second extrusion 410 may be connected by bolts or screws. In the illustrated embodiments, the tubes are oriented perpendicular to the protective beam 140 but the tubes may just as easily to oriented parallel to the protective beam 140. By having the upright supports 105 be extruded, the can be made cheaply and efficiently yet be strong, resilient, corrosion resistant and be easily replaceable.

Further, having the upright supports 105 be a two part design allows an increase in flexibility in use and implementation. As an example, the first extrusion 400 may be designed and manufactured for a variety of different trucks, all of which may have different mounting hole patterns, mounting hole locations, heights, etc. Thus, the first extrusion 400 may be manufactured to a variety of different trucks. At the same time, the second extrusion 410 may be manufactured in a consistent manner for all trucks. In this way, only the first extrusion 400 needs to be modified for the protective beam 140 to be attached to a new truck. At the same time, if there is damage to a part of the protective beam 140, it may be the case that only the second extrusion 410 may need to be replaced. In addition, attaching the protective beam 140 to the truck may be easier as the first extrusion 400, which may be relatively light, may be attached first and then the heavier, second extrusion 410 may be added by simply connecting the second extrusion 410 to the first extrusion 400.

Logically, the rectangular extruded tubes 400 proximate the tractor trailer floor (first extrusion) may be longer than extruded tubes 410 proximate the horizontal under run prevention beam 140 (second extrusion). As the first extrusion 400 may be required to provide some tilt resistance and impact strength, the longer length will be better at providing leverage against impacts. In addition, the extrusions 410 proximate the prevention beam 140 may be shorter which may crumple easier, resulting in sufficient protection in a crash but also providing some cushion in the result of a severe crash. The extrusions 400 410 may be cut to be angled to provide a sleek and pleasing appearance or may be left rectangular.

In some embodiments, the upright support 105 except the mounting structure 110 may be made from a single extrusion. While four horizontal members 130 are illustrated, more or less members 130 are possible and would function in an acceptable manner. Similarly, while two vertical members 120 are illustrated, more or less members 120 would function in acceptable manner assuming the members are designed of a sufficient size to carry out the function of supporting the prevention beam 140. Further, the orientation of the upright supports 105 including the elements of the vertical members 120 and horizontal members 130 within the upright supports, may be parallel or perpendicular to the protective beam 140 with minor adjustments and would function in a satisfactory manner.

Figure 8:
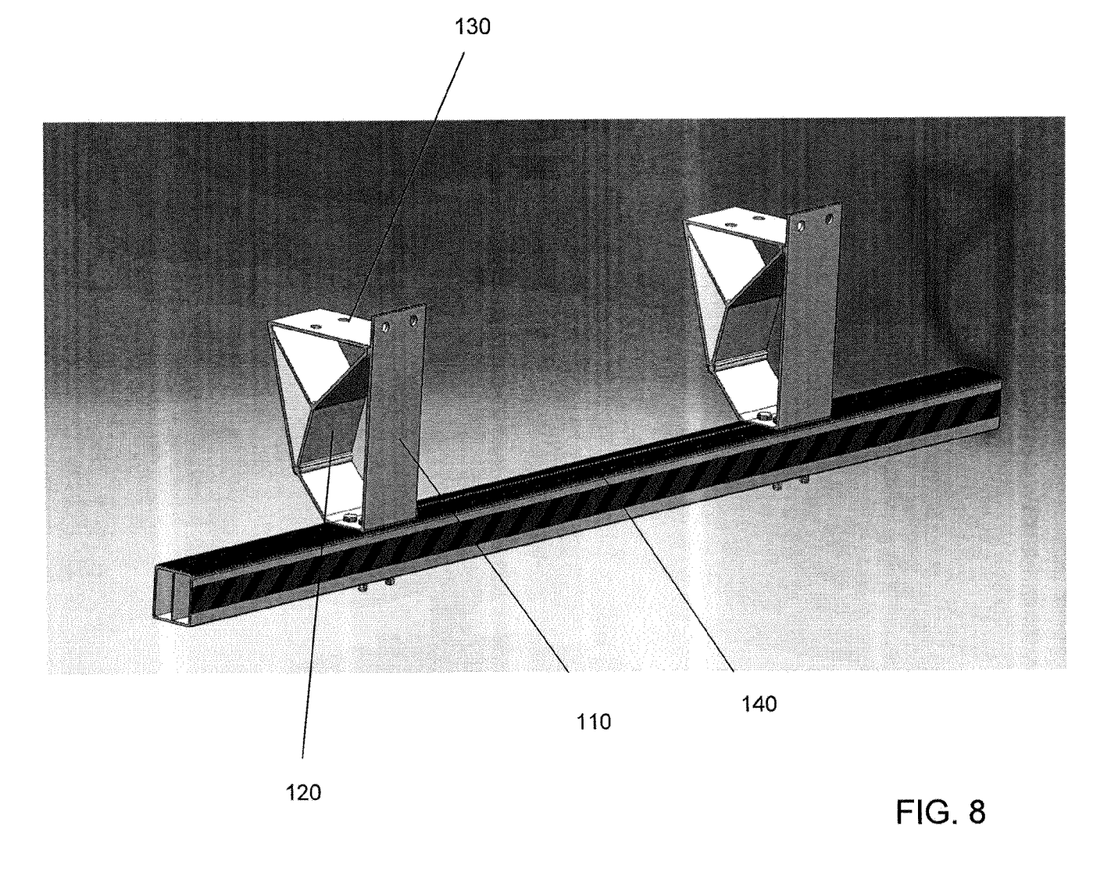
FIG. 8 is an illustration of an alternate embodiment of the device.
Figure 9:
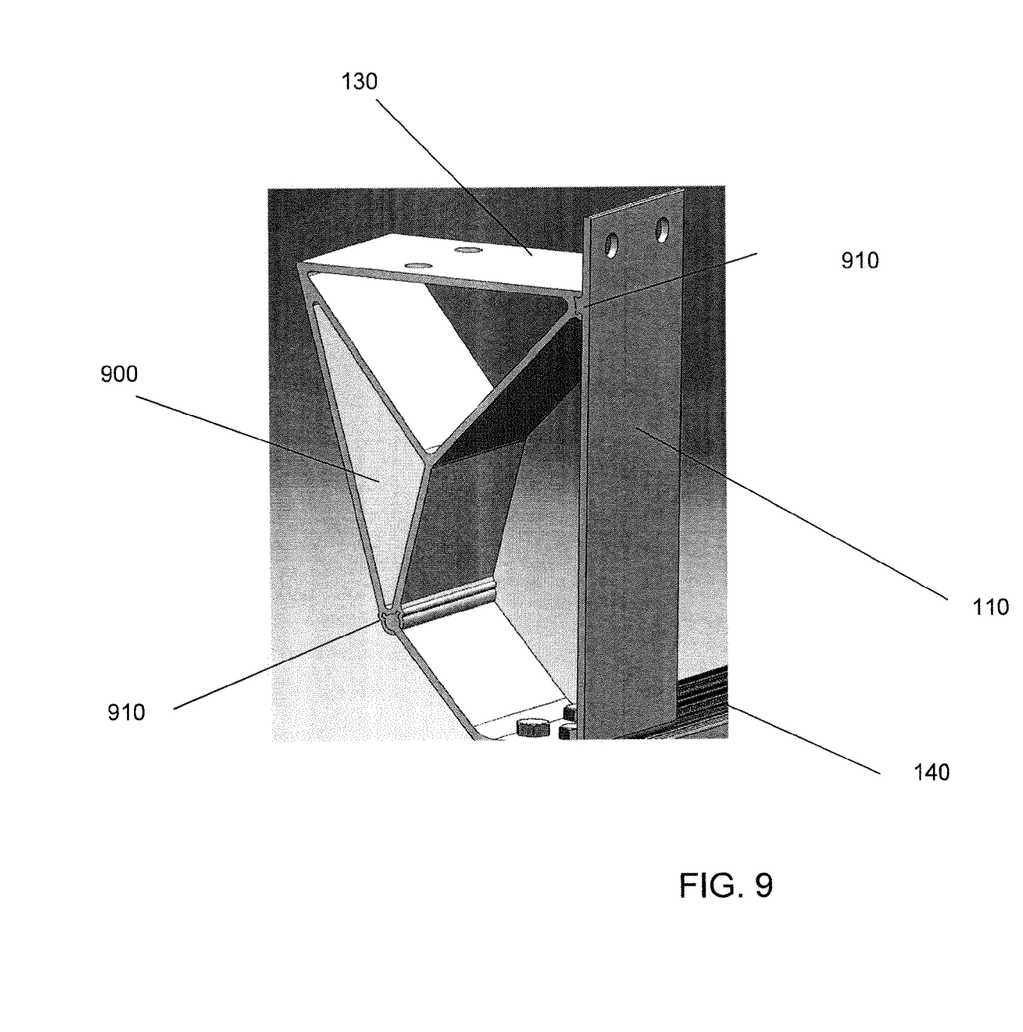
FIG. 9 is an illustration of the detail of the alternate embodiment of the device.
Figure 10:
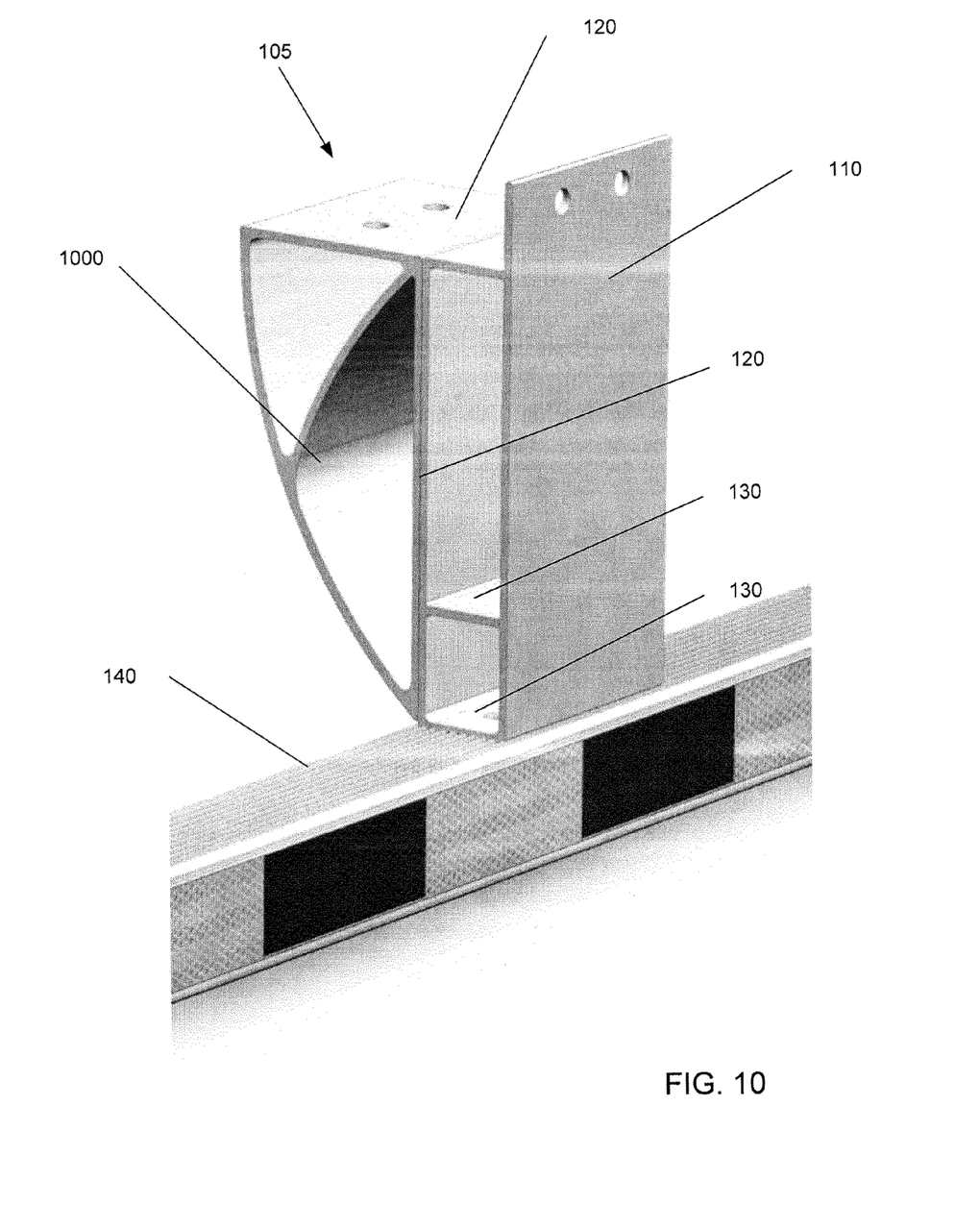
FIG. 10 is an illustration of a further embodiment of the support member of the device.

FIGS. 8-10 illustrate additional embodiments of the device 100. In FIG. 8, the vertical support 120 is not perpendicular as in the previous embodiments but is substantially parallel to the mounting plate 110. As illustrated in FIG. 9, the upright supports 105 are the connection of two extrusions, the first including the mounting plate 110 and the horizontal mount proximate the beam 140. The second extrusion 900 acts as a type of crumple zone that provides sufficient support of the protection beam 140 but gradually crumples under increasing pressure, providing additional protection to vehicles and/or people that run into the protection beam 140. The two extrusions may be connected using non-welded connection devices 910 such as bolts, sleeves, interlocks, etc. of the appropriate strength and durability.

FIG. 10 may illustrate yet another extrusion design. In this design, a curved extrusion 1000 provides a type of crumple zone to the upright supports 105. The first extrusion may be rectangular and may connect the protective beam 140 to the truck (not shown). The second extrusion 1000 may act as a type of crumple zone that provides sufficient support of the protection beam 140 but gradually crumples under increasing pressure, providing additional protection to people that run into the protection beam 140. The two extrusions may be connected using non-welded connection devices such as bolts, sleeves, interlocks, etc.

Figure 6:
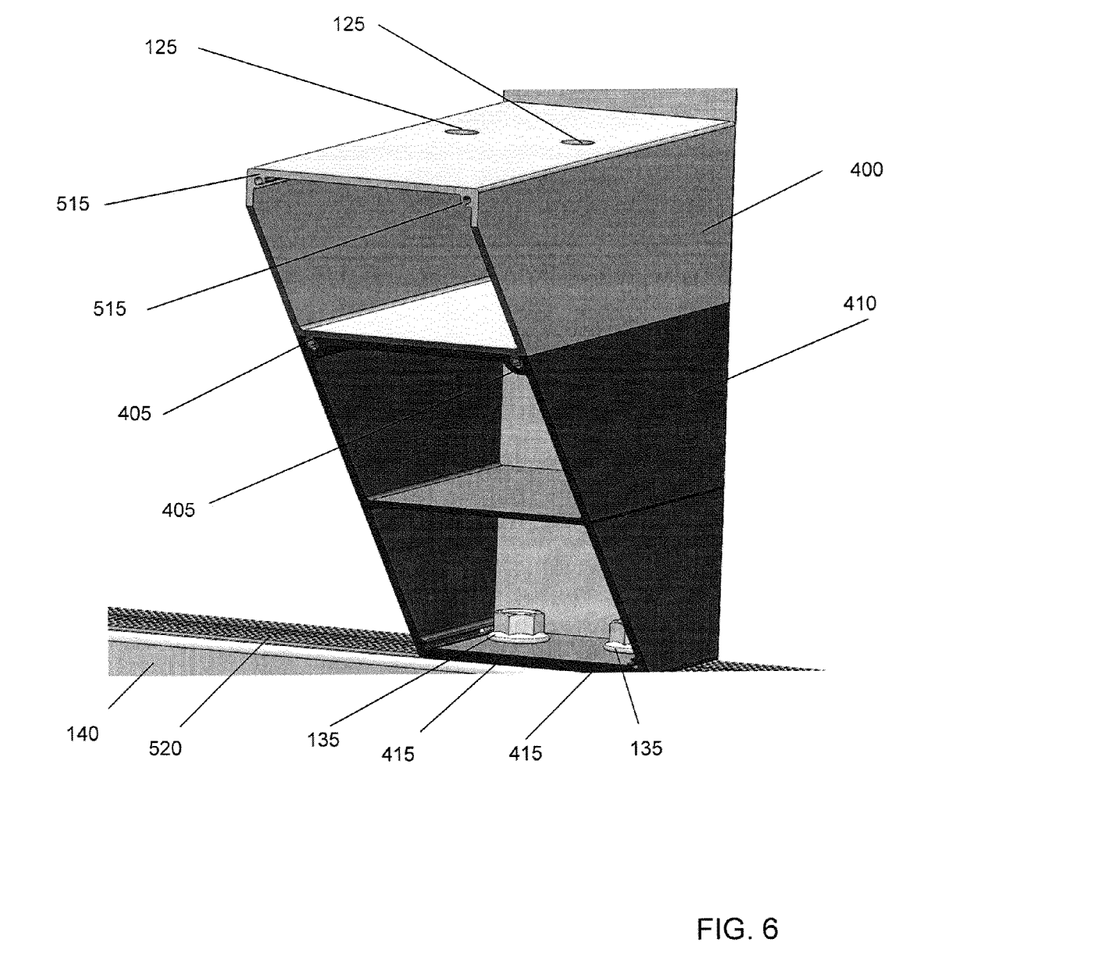
FIG. 6 is an illustration of a support that is made of two extruded tubes.

Referring again to FIG. 7, the apparatus 100 also may include a horizontal under-run protection beam 140. The protection beam 140 may be extruded from a material such as aluminum. The protection beam 140 may be made of other materials and it is desirable if the protection beam 140 has strength sufficient to withstand an impact from a car, be corrosion resistant and be light weight. As illustrated in FIG. 6, the protection beam 140 may have beam mounting openings 415 that correspond to the protection beam mounting openings 135 in one of the horizontal members 130, vertical members 120, the mounting plate 110, etc.

Figure 7:
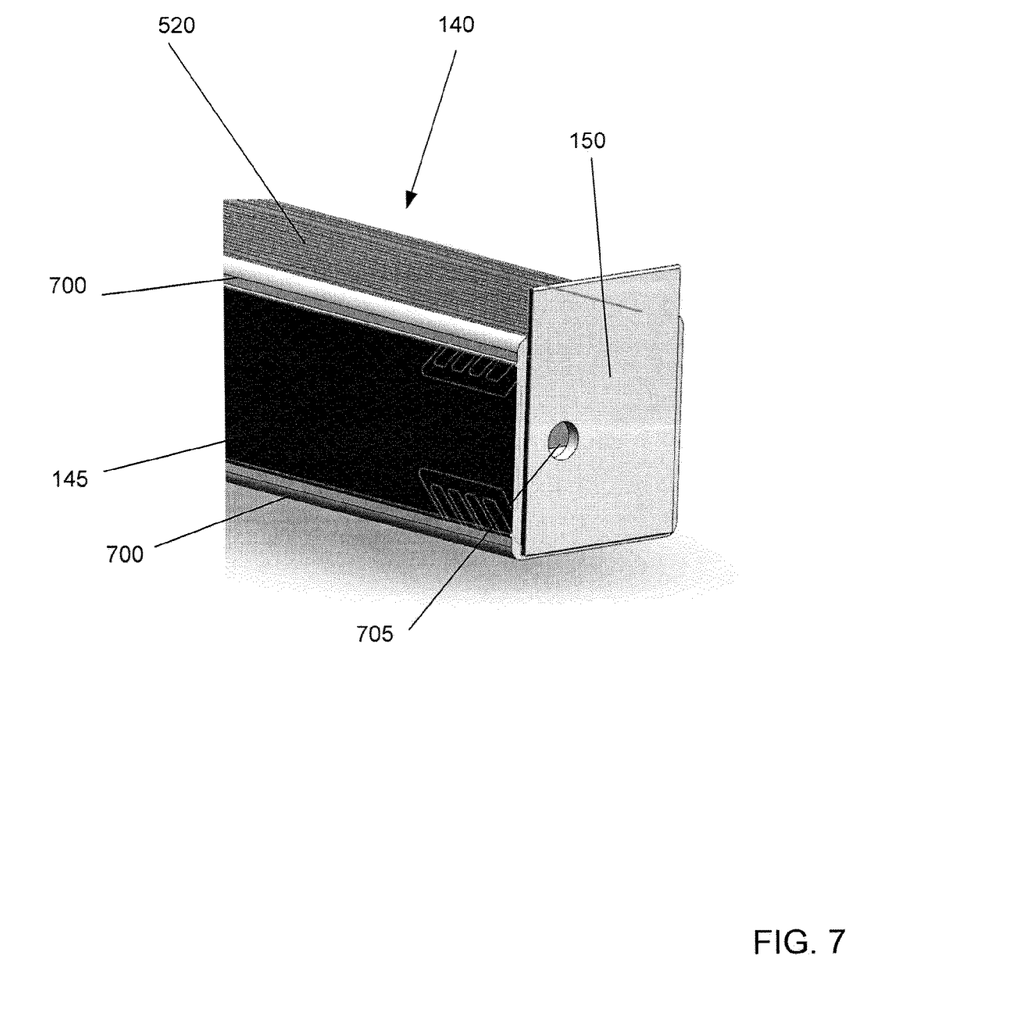
FIG. 7 is an illustration of the protection beam.

As illustrated in FIG. 7, the horizontal under-run prevention beam 140 also may have a removable reflective strip 145 that corresponds to reflective strip connections 700 in the beam. In one embodiment, the connections 700 are slots and the reflective strip 145 may slide into the slots. In this way, the reflective strip 145 may be easily replaced if it becomes damages or worn but be held securely in place.

For safety and to hold the reflective strip 145 in place, the horizontal under-run prevention beam 140 may also have end caps 150 that fit in a non-welded manner into the beam 140 to cover the end of the reflective strip connections 700. The caps 150 may be a friction fit, a snap fit, may adhere using an adhesive, may be held in place using screws, or in any other manner that ensures the cap 150 may be removable but may stay in place during thousands of miles of highway use. The end cap 150 may also have an opening 705 that may serve a variety of purposes, from being a point of leverage to remove the cap 150, to allowing drainage from the beam 140, to allowing a screw to be inserted to hold the cap 150 in place. The caps 150 may also be extruded aluminum or may desirably be another non corroding material.

The under run prevention beam 140 may also function as a step. A surface 520 may be added to the exposed horizontal surface of the beam 140 to allow a user to step on the beam 140 and not slip. The surface 520 may be ridges in the beam 140 or may be a rough surface applied with adhesive.

At the core, the design allows for a first aluminum extrusion 400 to be attached to the trailor and a second aluminum extrusion to be attached to the beam 140. The first extrusion 400 and second extrusion 410 may then be connected in a non-welded manner so that each 400 410 may be easily installed, serviced and replaced. The two extrusions 400 410 then connect to the beam in a non-welded manner (so it too may be easily removed, repaired or replaced) and support the protective beam 140 at a desired height. As is illustrated in FIGS. 1, and 8-10, the form of the first extrusion 400 and second extrusion 410 may be many and varied. In addition, additional extrusions such as a mounting plate 110 may be used as required to adjust the standard pieces to fit a variety of trailors, heights, mounting patterns, etc.

Advantageously, the described apparatus 100 may be made without any welds, meaning different parts of the apparatus 100 may be installed, adjusted and replaced with traditional tools that may be easily carried in the truck. Further, many parts may be standardized and may be able to be replaced interchangeably on a variety of trailor designs. As some of the material of the apparatus 100 may be aluminum, the apparatus 100 will be light weight yet sufficiently strong, corrosion resistant and durable. Further, as the aluminum is extruded, the manufacture may be simple, efficient and cost effective.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. An under-run protection device for a tractor trailer comprising:
   a plurality of upright supports, each upright support including:
      a mounting plate that includes vertical truck mounting holes,
      a plurality of vertical members, each vertical member adapted to be in non-welded communication with the mounting plate, at least one vertical member is perpendicular to the mounting plate, and
      a plurality of horizontal members, each horizontal member adapted to be in non-welded communication with i) at least two of the vertical members and ii) the mounting plate wherein i) at least one of the plurality of horizontal members includes horizontal truck mounting openings and ii) at least one of the plurality of horizontal members includes horizontal under-run prevention beam mounting openings; and
   a horizontal under-run prevention beam including i) mounting openings that correspond to the horizontal under-run prevention beam mounting openings for each upright support and ii) a removable reflective strip that corresponds to reflective strip openings in the horizontal under-run prevention beam.

2. The device of claim 1, wherein the horizontal under-run prevention beam further comprises end caps that include a non-welded fit into the horizontal under-run prevention beam and cover each end of the reflective strip openings.

3. The device of claim 2, wherein the end caps further include openings to secure the end caps to the horizontal under-run prevention beam.

4. The device of claim 1, wherein the horizontal under-run prevention beam further comprises a surface to act as a step.

5. The device of claim 1, wherein at least one of the mounting plate, the vertical members, the horizontal members, or the horizontal under-run prevention beam is made from extruded aluminum.

6. An under-run protection device for a tractor trailer comprising:
   a plurality of upright supports, each upright support including:
      a first aluminum extrusion including i) horizontal under-run prevention beam mounting openings and ii) vertical truck mounting openings, and
      a second aluminum extrusion i) including truck mounting openings and ii) connected to the first extrusion using non-welded connections; and
   a horizontal under-run prevention beam including i) mounting openings that correspond to the horizontal under-run prevention beam mounting openings for each upright support ii) and a removable reflective strip that corresponds to reflective strip openings in the beam.

7. The device of claim 6 wherein the first aluminum extrusion and the second aluminum extrusion support the horizontal under-run prevention beam at a desired height.

8. The device of claim 6, wherein the second aluminum extrusion is a crumple zone that gradually crumples under increasing pressure.

9. The device of claim 6, wherein the first aluminum extrusion includes a mounting plate.

10. An under-run protection device for a tractor trailer comprising:
    a plurality of upright supports, each upright support including:
       a mounting plate that includes vertical truck mounting holes, a first aluminum extrusion i) including horizontal truck mounting openings and ii) connected to the mounting plate using non-welded connections, and a second aluminum extrusion including horizontal under-run prevention beam mounting openings, wherein the second aluminum extrusion is connected using non-welded connections to i) the mounting plate and ii) the first aluminum extrusion; and a horizontal under-run prevention beam including i) mounting openings that correspond to the horizontal under-run prevention beam mounting openings for each upright support ii) and a removable reflective strip that corresponds to reflective strip openings in the beam.

11. The device of claim 10, wherein the first aluminum extrusion comprises at least a first rectangular extruded tube and the second aluminum extrusion comprises at least a second rectangular extruded tube.

12. The device of claim 11, wherein the at least first and the at least second rectangular extruded tubes are in communication via non-welded connections.

13. The device of claim 11, wherein the at least first and the at least second rectangular extruded tubes interlock.

14. The device of claim 11, wherein the at least first rectangular extruded tube proximate to the tractor trailer floor is longer than the at least second rectangular extruded tube proximate to the horizontal under-run prevention beam.

15. The device of claim 11 wherein at least one of the horizontal under-run prevention beam, the at least first rectangular extruded tube, the at least second rectangular extruded tube, or the mounting plate is removable and replaceable.

* * * * *